Feb. 4, 1930. R. P. SMITH 1,745,589
BOTTLE CAP ASSEMBLING MACHINE
Filed March 21, 1928 4 Sheets-Sheet 4

Witness
Martin H. Olsen.

Inventor
Robert P. Smith

Patented Feb. 4, 1930

1,745,589

UNITED STATES PATENT OFFICE

ROBERT P. SMITH, OF RIVERDALE STATION, ILLINOIS, ASSIGNOR OF ONE-HALF TO APEX STAMPING COMPANY, OF CHICAGO, ILLINOIS

BOTTLE-CAP-ASSEMBLING MACHINE

Application filed March 21, 1928. Serial No. 263,317.

In the production of cork-lined bottle caps which are largely used in bottling various kinds of liquids, the metal caps and thin cork disks which constitute the liners are separately formed, and are then assembled with the lining or sealing member cemented to the metal member, and the complete caps supplied by the manufacturer to bottlers or other users of such articles. My present invention relates to a machine for assembling the caps and lining members, and the machine illustrated and more particularly hereinafter described is designed for the rapid commercial production of caps having a corrugated skirt and lined with cork disk, such as are largely used in the bottling of carbonated beverages, although by suitable modification in proportions or dimensions of the parts it may be used for producing lined caps of other sorts. The object of my invention is the development of a machine which shall be suitable and efficient for the production of finished caps commercially on a large scale, and which by reason of various novel combinations and sub-combinations of cooperating parts and members, and various novel features of construction in the arrangement and construction of the parts of the machine shall be rapid in operation and more desirable and satisfactory for accomplishment of the ends in view than machines hitherto known. One particular object which I have had in view for the attainment of the foregoing purpose relates to a continuous, non-reciprocating movement of the parts employed in applying the cementing medium and assembling the parts of the cap; another relates to a novel circular-cam actuation of parts for assembling the cap and liner; another to a novel feeding mechanism for transferring the liner members from a stack of such members to the assembling mechanism; another to a novel pneumatic suction mechanism for supporting such liners during movements preliminary to the action of the assembling mechanism; another to a novel cement-applying mechanism; and still others, incidental to the foregoing, to various novel and advantageous features of construction will be apparent from the description hereinafter contained. In the appended claims I have more particularly pointed out the essential elements of my invention, it being understood that I intend to claim thereby all equivalents of the particular elements mentioned and all variations and modifications of the same falling within the spirit and scope of my invention.

In the accompanying drawings, which exemplify a preferred form of my invention.

Like reference characters indicate like parts in all the figures of the drawings.

First explaining briefly the general construction and mode of operation of my machine, it may be stated that the metal cap members are fed from a source of supply (as a hopper, not shown), skirt uppermost, through a chute which delivers them one by one to a horizontal rotating feeding table A from which they successively enter peripheral supporting notches in a cap conveyor B, rotating in a horizontal plane. By means of this conveyor the caps are then carried into the path of a circular series of lifting blocks carried by rotating assembling mechanism C, also horizontally arranged. During the first portion of their travel in the cap conveyor the caps pass underneath nozzles at the end of the tubular arms of a spider arranged to rotate on a horizontal axis and constituting a glue-feeding device D, which nozzles deposit a small quantity of adhesive in the bottom of each inverted cap and the caps then pass beneath a segmental gas burner which heats the glue and causes evaporation of its more volatile constituents.

The assembling mechanism includes a rotating frame in which is mounted the series of lifting blocks above mentioned, and a series of orificed liner-carriers which act also as pressure blocks in the operation of clamping the caps and liners together and are severally arranged in alignment with and above the lifting blocks. The cork wafers constituting the liner members of the assembled caps are transferred from a stack of such wafers by a rotating wafer-feeding device E successively into proximity to the liner-carriers by which carriers they are picked up through the action of a vacuum apparatus arranged to exert suction through the orifices of the carriers.

As the metal caps are successively brought by the rotating cap-carrying table above mentioned into registration with lifting blocks and pressure blocks or liner-carriers, above the former and below the latter, the lifting blocks are lifted by a cam to carry the caps into contact with the liners and are held with firm clamping pressure against the pressure blocks throughout a considerable arc of rotation, to afford time for the glue to cool and effect firm adhesion, after which the assembled caps are discharged from the machine.

Describing now in detail the machine as illustrated in the drawings, the oblong main frame 1 of the machine, supported on suitable leg members, includes cross-members 2 and 3 which respectively carry the assembly frame stud or pivot 4 and the cap conveyor stud 5.

The metal cap members, which are fed into the machine in single file by means of an inclined feed chute 6, are delivered onto the upper face of the rotating feeding table A, before mentioned, and are guided by an arcuate guide 7 into the path of notches formed in the peripheral ring member 9 of the cap-conveyor B. The inner side wall of the guide 7 preferably consists of a flexible spring 10, to avoid damage from jamming of the caps together by the action of the notched cap-carrying table 9, in case of irregular feed. The level of the two tables is such with respect to the size and shape of the caps that the lowermost, cylindrical portion of the skirt of each successively delivered cap will be received within a corresponding notch and the flared marginal portion or flange of the skirt will overhang the edge of the notch and support the cap therein. A stationary curved guide strip 8 adjacent the periphery of the notched conveyor and just outside the margin of the caps within the notches extends from the point of entrance of the caps into the notches to a point near where they are delivered to the assembling mechanism, and serves to confine the caps within the notches during their travel. At the rear end of this guide, i. e., adjacent the assembling mechanism, a terminal section 8$^a$, (which may be separately formed, as shown) extends adjacent the path described by the upper edge portion only of the caps, the guide member being cut away below to avoid interference with lifting blocks carried by the assembly frame hereinafter described.

The cap-conveyor B consists of a central hub 10' rotatably mounted on the stud 5 before mentioned, and a circular disk portion 11 which is shouldered adjacent its margin to form a seat for an adjusting ring 12 to which the notched member 9 is secured. To provide for angular adjustment of the notched member, the ring 12 is secured to the disk by bolts passing through elongated orifices in such ring, so that the parts 9 and 12 may be shifted angularly together into position to accurately register with the members of the assembling mechanism.

To the under side of the disk 11 is secured a gear 13 by means of which the cap-conveyor is rotated, through connections later to be described.

The upper end of the hub 10' of the rotating cap-conveyor is formed with a bevel gear 14 arranged to mesh with a bevel pinion 15 fixed to the hollow shaft 16 which carries the hub 17 of the spider of the glue-feeding device D. This shaft is journaled in a block 18 which forms an upward extension of the stationary cap-conveyor stud 5, and in a bearing 19 carried by a radial bracket arm 20 secured to said block. As illustrated, the interior of the tubular shaft communicates with a chamber within the block 18 and this chamber is also in communication with a supply tube 21 through which glue is supplied.

The spiders may conveniently be constructed as illustrated, with a peripherally flanged hub member 17 having its flange portion equipped with radially extending tubular arms 22 (six in number in the present instance) and provided with a cap plate 23 enclosing the central chamber of the spider structure.

The passage of cementing material through nozzles at the ends of the arms is controlled severally by inwardly opening spring-pressed valves 24, each having its loose-fitting stem formed with a group of spreading fingers 25 which contact with the bottom of a cap passing beneath it, the arrangement of the parts and ratio of the gearing being such that as the cap-conveyor and spider arms are rotated the valves will be successively opened and then permitted to close through contact of the fingers with successive caps in the notches of the conveyor. At each valve movement a small quantity of glue will pass through the valve opening around the stem and will be distributed by the fingers to separated points in the bottom of the cap.

Immediately after receiving glue from the glue-feeding device the caps are carried by the conveyor underneath the arcuate gas burner 26, supported by suitable bracket arms 27, which burner extends above the line of caps between a point adjacent such device and a point near the assembling mechanism. The heat from the burner serves to soften and partially dry the glue, as before explained, preliminary to the assembling operation.

The frame C of the assembly mechanism, which will next be described, has a circular bottom plate 28 formed with a hub 29 which is rotatably mounted on the stationary assembly frame stud 4 above mentioned. To this bottom plate are secured a lower frame ring 30 and an intermediate frame ring 31, which are rigidly secured together by bolts 32. As illustrated, these rings are L-shaped in cross-section, so that they present outwardly extending horizontal flanges, and for convenience in constructing and finishing the parts, these flanges are shouldered to receive respectively a lower ring section 33 and an intermediate ring section 34 which are rigidly secured to such flanges. The assembly frame includes also an upper ring 35 which is secured to the intermediate ring section 34 by screws or bolts 36 passing through spacing blocks 37 serving to separate the members.

The assembly frame, with parts carried thereby, is rotated by means of a depending gear ring 38 secured to the under side of the bottom plate 28 and engaged by a pinion 39 which is actuated through connections later to be described.

Concentric with and adjacent the periphery of the bottom plate 28 is arranged a cam ring 40 secured to the frame of the machine by screws 41 and spacing blocks 42. This ring is formed with a track forming a cam engaged by the rollers 43 of a circular series of lifting blocks 44 mounted to slide vertically in the lower ring section 33. The cam is arranged to begin to lift the rollers and blocks from lower position at about the radial plane marked $x$ on Fig. 2 of the drawings, shortly before reaching the common axial plane of the cap conveyor and assembly frame, and quickly reach uppermost position at the plane marked $y$, shortly after passing such common plane.

Above and in alignment with the blocks 44 is a set of downwardly spring-pressed pressure blocks 45 which are mounted to have a slight vertical movement in the intermediate ring section 34 and the upper ring member 35, the downward movement of such blocks being limited by nuts 46 on their upper ends. These blocks are centrally orificed and the suction passages through them are severally placed in communication with a vacuum chamber as the assembly frame revolves, through means which will now be described.

The casing 47 which encloses the vacuum chamber is supported in stationary position by the assembly frame stud 4, which is formed with a reduced portion 48 engaged by a depending collar secured by a set screw to such portion. The casing is enclosed at the top by a cover plate 49, and the chamber within is in communication through a pipe 50 with a vacuum pump or other means (not shown) for producing reduced pressure therein.

Figure 1:
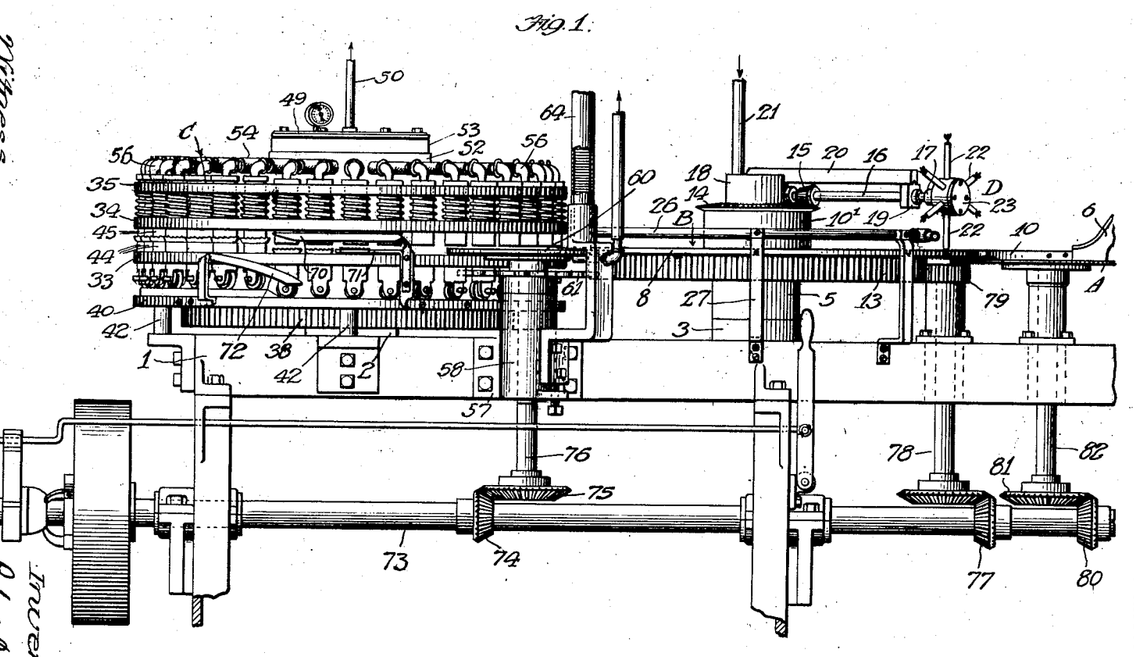
Figure 1 is a side elevation of my cap assembling machine.
Figure 2:
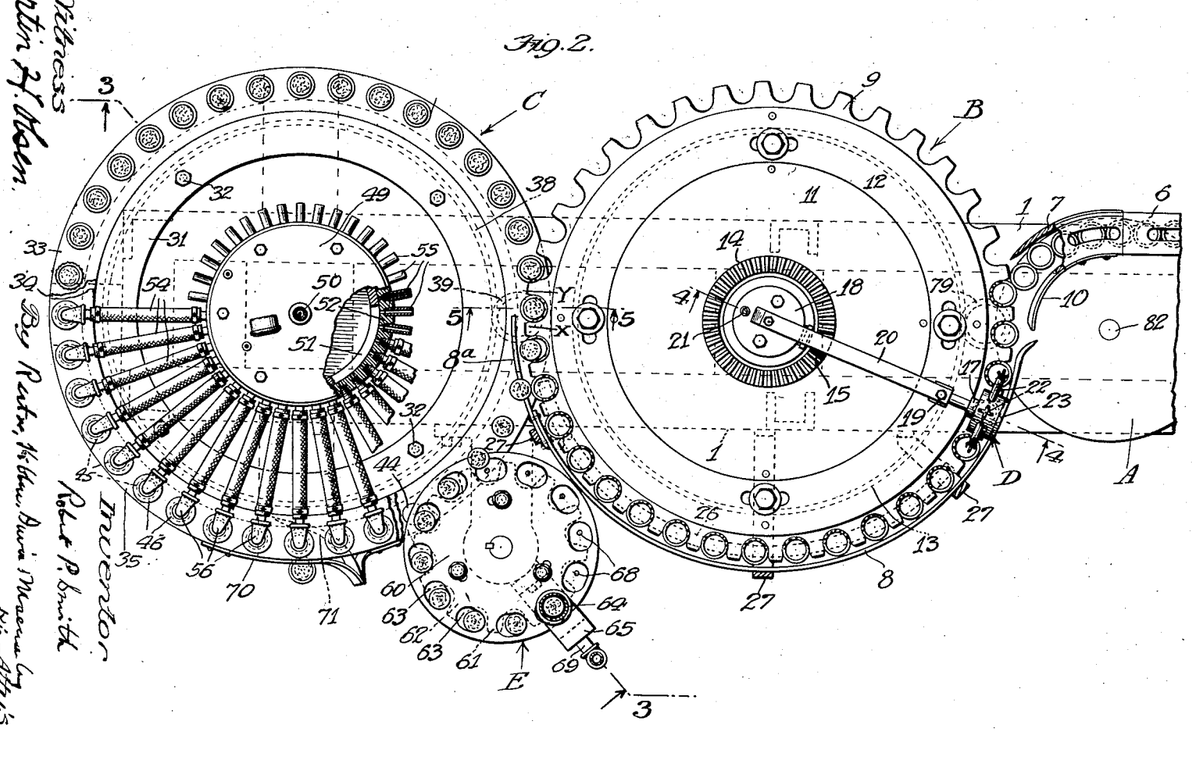
Fig. 2 is a plan view of the same.
Figure 3:
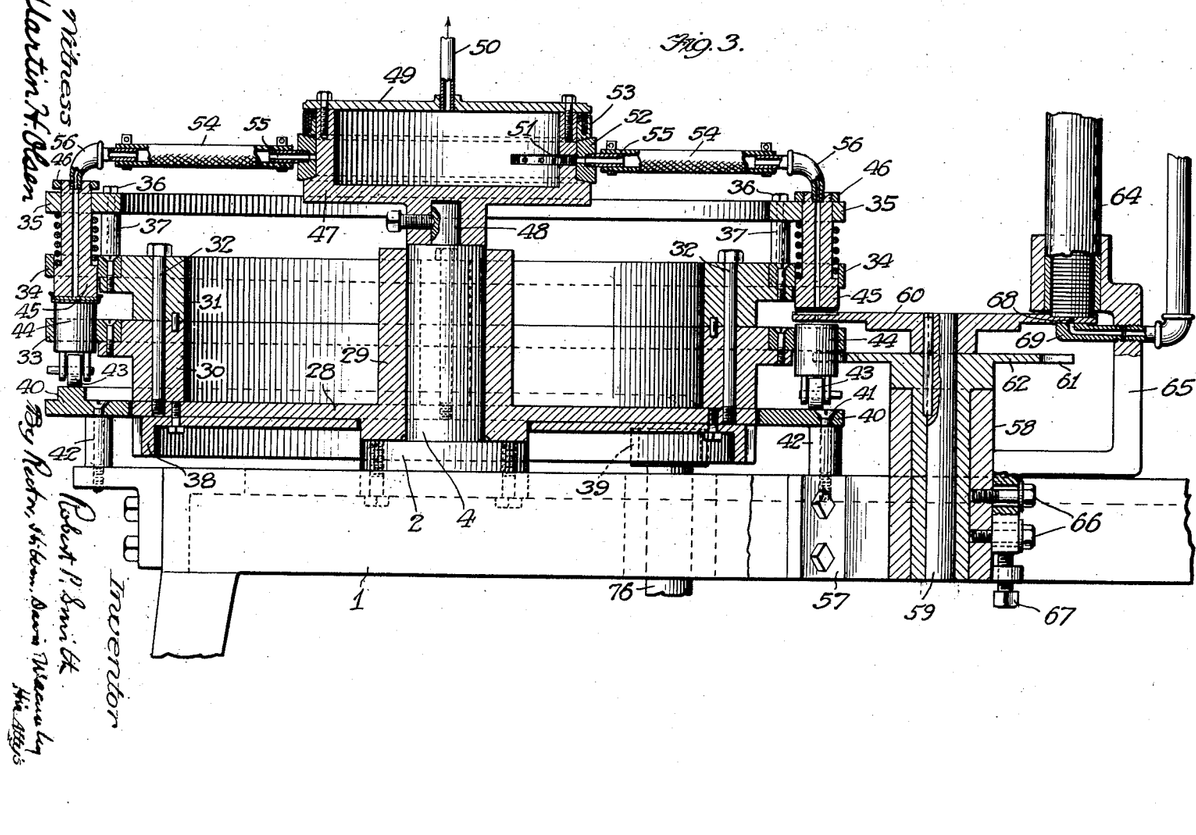
Fig. 3 is a vertical section, on a larger scale than Figs. 1 and 2, in a plane indicated by the dotted line 3—3 of Fig. 2.
Figure 4:
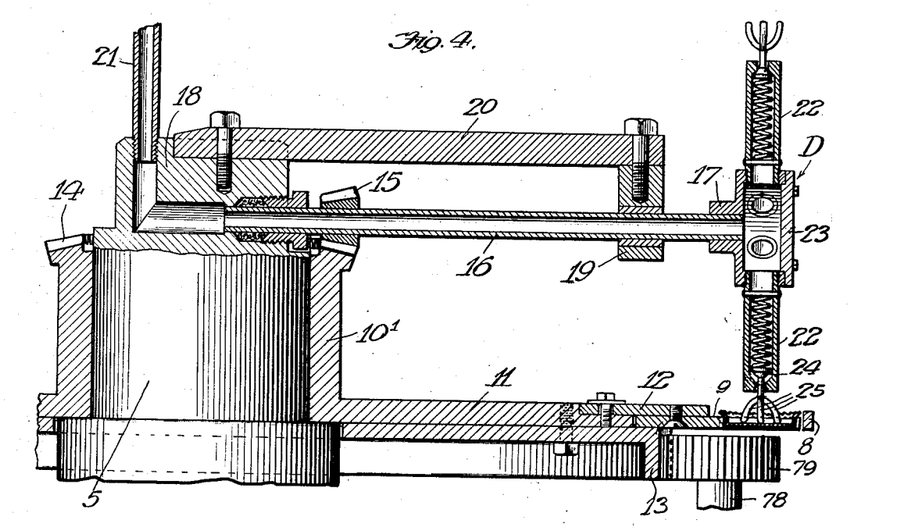
Fig. 4 is a vertical axial section of the cement-applying mechanism as indicated by the dotted line 4—4 of Fig. 2.

The cylindrical side wall of the casing 47 is formed with an arcuate port 51 which extends at its opposite ends to points slightly beyond the planes indicated by the dotted lines 3—3 and 5—5 of Fig. 2. A valve ring 52 extending above and below this port rotatably engages a cylindrical seat formed on the outer face of the casing 47, this ring being formed with opposite coned faces and a spring-pressed packing ring 53 formed with a complementary coned face being provided to prevent leakage of air. The valve ring is formed with a series of radial orifices corresponding in number to the pressure blocks 45, and each orifice is in communication with the suction passage in a corresponding pressure block through a section of rubber hose 54 which is secured at one end to a nipple 55 seated in the ring and at the other end to a bent tubular connection 56 seated in the particular block. While the connection described of course exhibits some measure of flexibility, it is entirely adequate to effect rotation of the valve ring in unison with the assembly frame as the latter is rotated.

The liner-feeding mechanism next to be described is carried by a frame bracket having a bearing portion 58 in which is rotatably mounted a vertical shaft 59 to the upper end of which is fixed a feed disk 60. Below the feed disk a sprocket 61 is also secured to the shaft 59, this sprocket lying in the plane of the lifting blocks 44 and being formed with peripheral notches 62 arranged to mesh with the blocks, whereby rotation of the assembly frame will cause the feed disk to rotate. The upper face of the feed disk is formed with recesses 63 of a depth equalling the thickness of the cork disks or liners to be fed, and these recesses are somewhat elongated in a direction extending circumferentially of the feed disk. The recesses are so spaced that they will successively come into axial alignment with successive liner carriers or pressure blocks 45 on the assembly frame as the recesses and blocks reach the common axial plane of the feed disk and assembly frame.

The liners are deposited one by one in the recesses of the feed disk from the open lower end of a fuel tube 64 which is supported by a bracket 65 secured by bolts 66 to the frame bracket 57 before mentioned. To provide for nice vertical adjustment of the feed tube in accordance with the thickness of the liners being used, the slots in the bracket engaged by the bolts 66 are slightly elongated vertically, and an adjusting screw 67 is provided.

At the bottom of each recess 63 the feed disk 60 is formed with an orifice 68 preferably axially of the rear or working end of the recesses, and the recesses succesively come into registration with the open upper end of a suction tube 69, arranged below and in axial alignment with the feed tube 64 and slidingly fitting against the lower face of the feed disk. This tube 69 is in constant communication with appartus for producing reduced pressure, which may conveniently be the same as that to which the pipe 50, before mentioned, is connected. The effect of suction through these orifices 68, as each recess 63 and its orifice momentarily comes into alignment with the feed tube 64, will be to draw the lowermost disk downwardly and seat it snugly in the recess, while when the wafer in the recess has reached its position of alignment with the pressure block 45 the effect of the orifice 68 will be to admit atmospheric pressure freely to the underside of the liner, so that the suction then established through the suction passage of the block will act effectively to lift the wafer out of the recess in the feed plate and cause it to seat against the lower face of the block.

Figure 5:
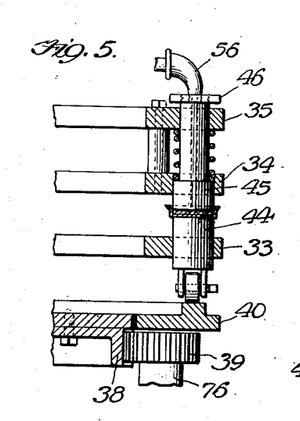
Fig. 5 is a fragmentary vertical section on the line 5—5 of Fig. 2.
Figure 6:
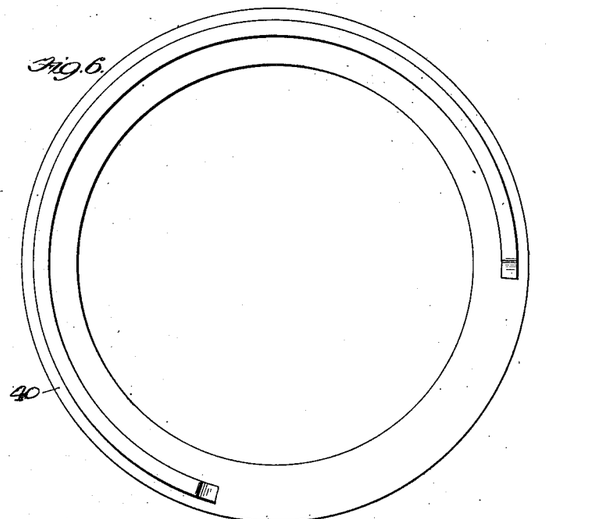
Fig. 6 is a plan view of a cam ring forming part of the cap-assembling mechanism.

It may now be explained that the cap conveyor and assembly frame are rotated synchronously and in such relation that the cap members are successively centered between the lifting blocks 44 and liner carriers or pressure blocks 45 at the time these parts reach the common axial plane of the rotating members, at which time the lifting blocks are being quickly lifted from lower to upper position. Before this time, as the successive orifices in the valve ring 52 connected respectively with the vacuum passages of successive liner-carriers or pressure blocks had become exposed to reduced pressure through the port 51 of the vacuum chamber, each liner carrier had picked up a liner and was holding it by suction against its lower face. As the lifter blocks now successively ascend to upper position, each block will lift the cap above it against the liner suctionally held against the lower face of the pressure block thereabove and will lift the pressure block slightly against its spring tension (see Fig. 5). Immediately afterward suction through the exhaust passage of such pressure block is shut off.

It is obvious that the lifter blocks and pressure blocks function as clamping members in assembling the glued caps and liners, and that to this action the fundamental requirement is one of relative movement only. I therefore regard a clamping movement of the upper clamping members alone, or a clamping movement of both upper and lower members, as the full equivalent of my specific construction in which the clamping movement is imparted to the lower set, which I have termed lifting blocks.

The assembled caps and liners now travel through an arc of about two thirds of a circle while the caps are cooling with the rollers of the lifting blocks riding on the higher face of the cam ring 40 and the caps and liners clamped in contact under spring pressure between the lifting blocks and pressure blocks. As the inclined face of the track leading to the lower level of the cam is reached and the lifting blocks descend, a curved stripper finger 70 adjacent the outer line of the path of travel of the pressure blocks and overhanging the edges of the caps ensures the stripping of the caps downwardly from the pressure blocks, while a thin curved guide finger 71 is provided to direct the caps outwardly and discharge them from the machine.

To ensure descent of the lifting blocks from their upper to their lower level, a curved guide finger 72 may be employed, arranged to cooperate with the extended pintles of the rollers 43.

The means for synchronously rotating the rotatable parts of the machine include a horizontal main shaft 73 driven by any suitable means. This main shaft is equipped with a bevel pinion 74 arranged to mesh with a pinion 75 on the lower end of a vertical shaft 76, journaled in bearing carried by the machine frame. The shaft 76 carries at its upper end the pinion 39 hereinbefore mentioned, through which the assembly frame (and through it the feed disk 60) is rotated.

The main shaft also carries a bevel pinion 77 fixed to the lower end of a vertical shaft 78 which is journaled in bearings carried by the frame of the machine and at its upper end carries a pinion 79 meshing with the gear 13 fixed to the disk portion 11 of the cap-conveyor.

The main shaft 73 is further equipped with a bevel pinion 80 meshing with a bevel pinion 81 secured to the bottom of a vertical shaft 82, to the upper end of which the feeding table A is secured.

I claim:

1. In a cap and liner assembling machine, a horizontal peripherally-notched rotating conveyor arranged to support the caps, means for feeding caps into said notches, means for depositing glue in caps in the conveyor notches, a rotating assembly frame equipped with lifting blocks arranged to be rotated into vertical alignment with and below caps in the conveyor notches, and also equipped with pressure blocks above and in alignment with said lifting blocks, said pressure blocks being severally provided with means for supporting liners on their under faces, and means for lifting in succession each lifting block and an interposed cap against an interposed liner and said pressure block at position of alignment.

2. A cap and liner assembling machine according to claim 1 having said cap-conveyor member and said assembly frame angularly adjustable relatively to each other.

3. A cap and liner assembling machine according to claim 1 in which said cap-conveyor member includes a central hub member and a peripherally-notched ring member secured to said hub member and angularly adjustable with respect thereto.

4. In a cap and liner assembling machine, a horizontal peripherally-notched rotating conveyor arranged to support the caps, means for feeding caps into said notches, means for depositing glue in caps in the conveyor notches, a rotating assembly frame equipped with lifting blocks arranged to be rotated into vertical alignment with and below caps in the conveyor notches and also equipped with pressure blocks above and in alignment with said lifting blocks, said pressure blocks being each formed with a suction passage having an opening on the under face of the block, means for feeding liners to a point beneath said suction opening, and means for lifting in succession each lifting block and an interposed cap against an interposed liner and said pressure block at position of alignment.

5. In a cap and liner assembling machine, a horizontal peripherally-notched rotating conveyor arranged to support the caps, means for feeding caps into said notches, means for depositing glue in caps in the conveyor notches, a rotating assembly frame equipped with lifting blocks arranged to be rotated into vertical alignment with and below caps in the conveyor notches and also equipped with pressure blocks above and in alignment with said lifting blocks, said pressure blocks being each formed with a suction passage having an opening on the under face of the block, a rotating plate formed with liner-receiving recesses on its upper face and arranged to be rotated synchronously with said frame to bring said pressure blocks and recesses successively into vertical alignment, means for connecting the passage in each block in succession to reduced pressure while the block and recess are in alignment, and means for lifting in succession each lifting block and an interposed cap against an interposed liner and said pressure block at position of alignment.

6. In a cap and liner assembling machine, a horizontal peripherally-notched rotating conveyor arranged to support the caps, means for feeding caps into said notches, means for depositing glue in caps in the conveyor notches, a rotating assembly frame equipped with lifting blocks arranged to be rotated into vertical alignment with and below caps in the conveyor notches, and also equipped with pressure blocks above and in alignment with said lifting blocks, said pressure blocks being severally provided with means for supporting liners on their under faces, and a circular cam arranged to lift in succession each lifting block and an interposed cap against an interposed liner and said pressure block at position of alignment and maintain them in contact through an extended arc of rotation.

7. In a machine of the character described, a circular peripherally notched rotating conveyor, means for feeding caps into said notches, a glue-feeding device for depositing glue in caps in said notches, and an arcuate heater and above adjacent the path of travel of caps in said notches having downwardly directed burner jets for warming and drying the glue preparatory to further operations.

8. In a machine having a horizontal rotating conveyor arranged to support a circular train of caps in inverted position, a glue feeding device having a chambered hub mounted to rotate on a horizontal axis and tubular arms communicating with the chamber in said hub and having terminal nozzles arranged to travel at the bottom of their path in proximity with caps in the conveyors, the passages in said hub and arms being connected with a glue supply and said nozzles being arranged to successively deposit charges of glue in said inverted caps as each particular cap and corresponding nozzle pass through their position of proximity.

9. A machine according to claim 8 in which the machine frame is provided with a stationary conveyor stud and said cap-conveyor is rotatably mounted on said stud and in which said glue-feeding device is supported by said stud.

10. In a machine having a horizontal rotating conveyor arranged to support a circular train of caps in inverted position, a glue feeding device having a chambered hub mounted to rotate on a horizontal axis and tubular arms communicating with the chamber in said hub and having terminal nozzles arranged to travel at the bottom of their path in proximity with caps in the conveyors, the passages in each of said hub and arms being connected with a glue supply and said nozzles being equipped with a valve member arranged to be opened and closed by contact with the bottom of a cap as each particular cap and corresponding nozzle pass through their position of proximity.

11. In a machine having a horizontal rotating conveyor arranged to support a circular train of caps in inverted position, a glue feeding device having a chambered hub mounted to rotate on a horizontal axis and tubular arms communicating with the chamber in said hub and having terminal nozzles arranged to travel at the bottom of their path in proximity with caps in the conveyors, the passages in each of said hub and arms being connected with a glue supply and said nozzles being equipped with an inwardly opening spring-pressed valve having an outwardly extending stem arranged to be actuated by contact with the bottom of a cap as each particular cap and corresponding nozzle pass through their position of proximity.

12. A glue-feeding structure according to claim 11 in which said stem is equipped with a group of spreading fingers constituting the contact members.

13. In a machine of the character described, cap-feeding means for advancing a train of inverted caps, a glue-feeding device arranged to apply glue to the bottoms of said caps, a rotating assembly frame equipped with a circular set of lifting blocks vertically movable between lower and upper position and arranged to receive in succession caps delivered by said cap-feeding means to the top of said blocks in lower position, said frame being also equipped with pressure blocks above and in axial alignment with said lifting blocks, means for supporting liners on the lower faces of said pressure blocks, and means for lifting in succession each lifting block and a cap thereon against an interposed liner and the corresponding pressure block.

14. In a machine of the character described, cap-feeding means for advancing a train of inverted caps, a glue-feeding device arranged to apply glue to the bottoms of said caps, a rotating assembly frame equipped with a circular set of lifting blocks vertically movable between lower and upper position and arranged to receive in succession caps delivered by said cap-feeding means to the top of said blocks in lower position, said frame being also equipped with pressure blocks above and in axial alignment with said lifting blocks, means for supporting liners on the lower faces of said pressure blocks, and means governed by rotation of the frame for automatically lifting in succession each lifting block and a cap thereon against an interposed liner and the corresponding pressure block.

15. In a machine of the character described, cap-feeding means for advancing a train of inverted caps, a glue-feeding device arranged to apply glue to the bottom of said caps, a rotating assembly frame equipped with a circular set of lifting blocks vertically movable between lower and upper position and arranged to receive in succession caps delivered by said cap-feeding means to the top of said blocks in lower position, said frame being also equipped with spring-pressed pressure blocks above and in axial alignment with said lifting blocks and said pressure blocks being formed severally with a suction passage and a suction opening on the lower side of each, a vacuum device communicating with said suction passages for supporting liners on the lower faces of said pressure blocks, and means governed by rotation of the frame for automatically lifting in succession each lifting block and a cap thereon against an interposed liner and the corresponding pressure block.

16. In a cap and liner assembling machine having the machine frame provided with a stationary assembly frame stud, cap-feeding means for advancing a train of caps, a glue-feeding device arranged to apply glue to the bottoms of said caps, an assembly frame mounted on said stud and equipped with a circular set of lifting blocks vertically movable between lower and upper position and arranged to receive in succession caps delivered by said cap-feeding means to the top of said blocks in lower position, said frame being also equipped with pressure blocks above and in axial alignment with said lifting blocks and said pressure blocks being each formed with a suction passage having an opening on the under face of such block, means for feeding liners in succession to a point occupied successively by the suction openings of said pressure blocks, a casing forming a vacuum chamber supported on said stud, valve means connected with said frame and separately governing communication between said chamber and the suction passages of said pressure blocks for intermittently producing reduction of pressure in each passage while opposite a liner, and means governed by rotating of the frame for lifting in succession each lifting block and a cap thereon against an interposed liner and the corresponding pressure block.

17. In a cap-assembling machine having a rotating frame equipped with a circular series of liner-carriers formed with suction passages and orifices and liner-feed mechanism for feeding liners into proximity to the suction orifices, a valve mechanism for intermittently subjecting said suction passages in succession to reduced pressure including a central vacuum chamber formed with an arcuate port, and a valve ring rotatably mounted in a seat in said casing, said valve ring being formed with a series of openings cooperating with said port and communicating respectively with said suction passages in the liner carriers.

18. In a cap-assembling machine having a rotating frame equipped with a circular series of liner-carriers formed with suction passages and orifices and liner-feed mechanism for feeding liners into proximity to the suction orifices, a valve mechanism for intermittently subjecting said suction passages in succession to reduced pressure including a central vacuum chamber formed with an arcuate port, a valve ring formed with a corresponding series of openings cooperating with said port, and a series of flexible tubular connections connecting corresponding openings in the valve ring and suction passages in the liner carriers.

19. In a cap-assembling machine having a rotating frame equipped with a circular series of liner-carriers formed with suction passages and orifices on their lower faces, means for feeding liners to said carriers comprising a rotating feed disk having its peripheral portion arranged underneath and adjacent the path of the lower faces of said carriers and formed with recesses on its upper face arranged to rotate in succession into alignment with such carriers, means for supplying liners to such recesses, and means for inducing suction in said suction passages of the carriers in succession at the point of alignment of said carriers and recesses.

20. In a cap-assembling machine having a rotating frame equipped with a circular series of liner-carriers formed with suction passages and orifices on their lower faces, means for feeding liners to said carriers comprising a rotating feed disk having its peripheral portion arranged underneath and adjacent the path of the lower faces of said carriers and formed with recesses on its upper face arranged to rotate in succession into alignment with such carriers, said recesses being elongated circumferentially of the disk, a feed tube arranged to receive a stack of liners and having a lower open end adjacent the plane of the face of the disk and in the path of the recesses, and means for inducing suction in said suction passages of the carriers in succession at the point of alignment of said carriers and recesses.

21. In a cap-assembling machine having a rotating frame equipped with a circular series of liner-carriers formed with suction passages and orifices on their lower faces, means for feeding liners to said carriers comprising a rotating feed disk having its peripheral portion arranged underneath and adjacent the path of the lower faces of said carriers and formed with recesses in its upper face arranged to rotate in succession into alignment with such carriers, and also formed with orifices at the bottom of said recesses, a stationary member slidingly engaged by the orificed lower face of the disk and formed with a passage under reduced pressure and communicating successively with the orifices of said plate, a feed tube arranged to receive a stack of liners and having a lower open end adjacent the plane of the face of the disk and in the path of the recesses, and means for inducing suction in said suction passages of the carriers in succession at the point of alignment of said carriers and recesses.

22. In a machine having a frame provided with a stationary conveyor stud formed with gear teeth adjacent its upper portion, a rotating conveyor pivoted on said stud below said gear teeth and arranged to support a circular train of caps in inverted position, and a glue feeding device having tubular arms fixed to a horizontal shaft journaled in bearings carried by said conveyor stud, said shaft extending axially of the conveyor and being equipped with a pinion meshing with said gear teeth and arranged to rotate said arms and bring their terminal portions successively into proximity to caps in the conveyor.

23. In a cap and liner assembling machine, a horizontal continuously rotating cap-conveyor, a glue-feeding device having arms continuously rotating in a vertical plane and provided with delivery nozzles rotating successively to a point of contact with successive caps carried by the container, an assembly frame rotating continuously on a vertical axis and equipped with a circular lower set of blocks arranged to receive caps from said conveyor, an upper set of blocks in vertical alignment with said lower set of blocks, the blocks of said upper set being formed with suction passages and orifices arranged to support liners and one of said sets of blocks having a vertical clamping movement and a circular cam on the machine frame arranged to shift the blocks of the movable set successively into clamping engagement with the blocks of the other set against an interposed cap and liner.

24. In a machine of the character described, a horizontally arranged rotating assembly frame, a circular set of lifting blocks mounted in said frame and movable between open and clamping position, a corresponding set of vertically movable pressure blocks in alignment with said lifting block also mounted in said frame, said pressure blocks being formed with suction passages and orifices in communication with means for exhausting pressure, cap-feeding mechanism arranged to feed caps to said lifting blocks, liner-feeding mechanism arranged to feed caps to said pressure blocks, said cap-feeding mechanism and said liner feeding mechanisms being adjacent each other, a stationary circular cam having an incline arranged to quickly lift said lifting blocks successively from open to clamping position adjacent said two feeding mechanisms and lying beyond the same in the path of travel of the lifting blocks and a dwell arranged to maintain clamping position through an extended arc of rotation and an incline arranged to permit said lifting blocks to descend to open position, and a stationary guide blade opposite such open position of the blocks for discharging the completed caps from the machine.

In testimony whereof, I have subscribed my name.

ROBERT P. SMITH.